United States Patent [19]
Edwards et al.

[11] Patent Number: 6,159,404
[45] Date of Patent: Dec. 12, 2000

[54] LOW TEMPERATURE, HIGH SPEED EXTRUSION COATING PROCESS AND POLYETHYLENE COMPOSITIONS USEFUL THEREFOR CONTAINING A THERMALLY SENSITIVE ADDITIVE

[75] Inventors: Ray Edwards, Henderson, Tex.; William A. Mruk, Rochester, N.Y.

[73] Assignee: Eastman Chemical Company, Kingsport, Tenn.

[21] Appl. No.: 08/233,482

[22] Filed: Apr. 26, 1994

Related U.S. Application Data

[63] Continuation of application No. 07/681,801, Apr. 5, 1991, abandoned, which is a continuation-in-part of application No. 07/578,036, Sep. 5, 1990, abandoned, which is a continuation-in-part of application No. 07/366,903, Jun. 15, 1989, abandoned.

[51] Int. Cl.[7] .................................................... B29C 31/00
[52] U.S. Cl. .................................. 264/171.1; 264/171.14; 264/211.12; 427/358
[58] Field of Search .............................. 264/171.1, 171.14, 264/171.25, 211.12, 211.13, 209.7; 428/207.1, 208.2

[56] References Cited

U.S. PATENT DOCUMENTS

| | | |
|---|---|---|
| 3,418,396 | 12/1968 | Edwards . |
| 3,887,640 | 6/1975 | Diaz et al. . |
| 4,289,670 | 9/1981 | Creekmore .............................. 524/275 |
| 4,526,919 | 7/1985 | Edwards .................................. 524/271 |
| 4,528,312 | 7/1985 | Edwards .................................. 524/232 |
| 4,572,874 | 2/1986 | Chang ..................................... 428/523 |
| 4,650,747 | 3/1987 | Uno ......................................... 430/536 |
| 4,654,389 | 3/1987 | Graham ................................... 524/272 |
| 5,049,595 | 9/1991 | Dethlefs et al. ........................ 523/321 |

FOREIGN PATENT DOCUMENTS

| | | |
|---|---|---|
| 798908 | 11/1968 | Canada . |
| 0 052 889-A1 | 6/1982 | European Pat. Off. . |
| 0 136 874-A2 | 4/1985 | European Pat. Off. . |
| 0 373 300-A2 | 6/1990 | European Pat. Off. . |
| 0 407 309-A1 | 1/1991 | European Pat. Off. . |
| 200524 | 5/1983 | Germany . |
| WO 88/09354 | 12/1988 | WIPO . |

*Primary Examiner*—Christopher Henderson
*Attorney, Agent, or Firm*—Jonathan D. Wood; Bernard J. Graves, Jr.; Harry J. Gwinnell

[57] ABSTRACT

Novel polyethylene compositions comprising a blend of a polyethylene component having defined properties, a specific quantity of defined tackifying resins and defined quantities of thermally sensitive additives are disclosed. In addition, process for extrusion coating at high speeds and relatively low extrusion coating temperatures employing invention compositions is disclosed.

9 Claims, 6 Drawing Sheets

DSC

D S C

DSC

DSC

DSC

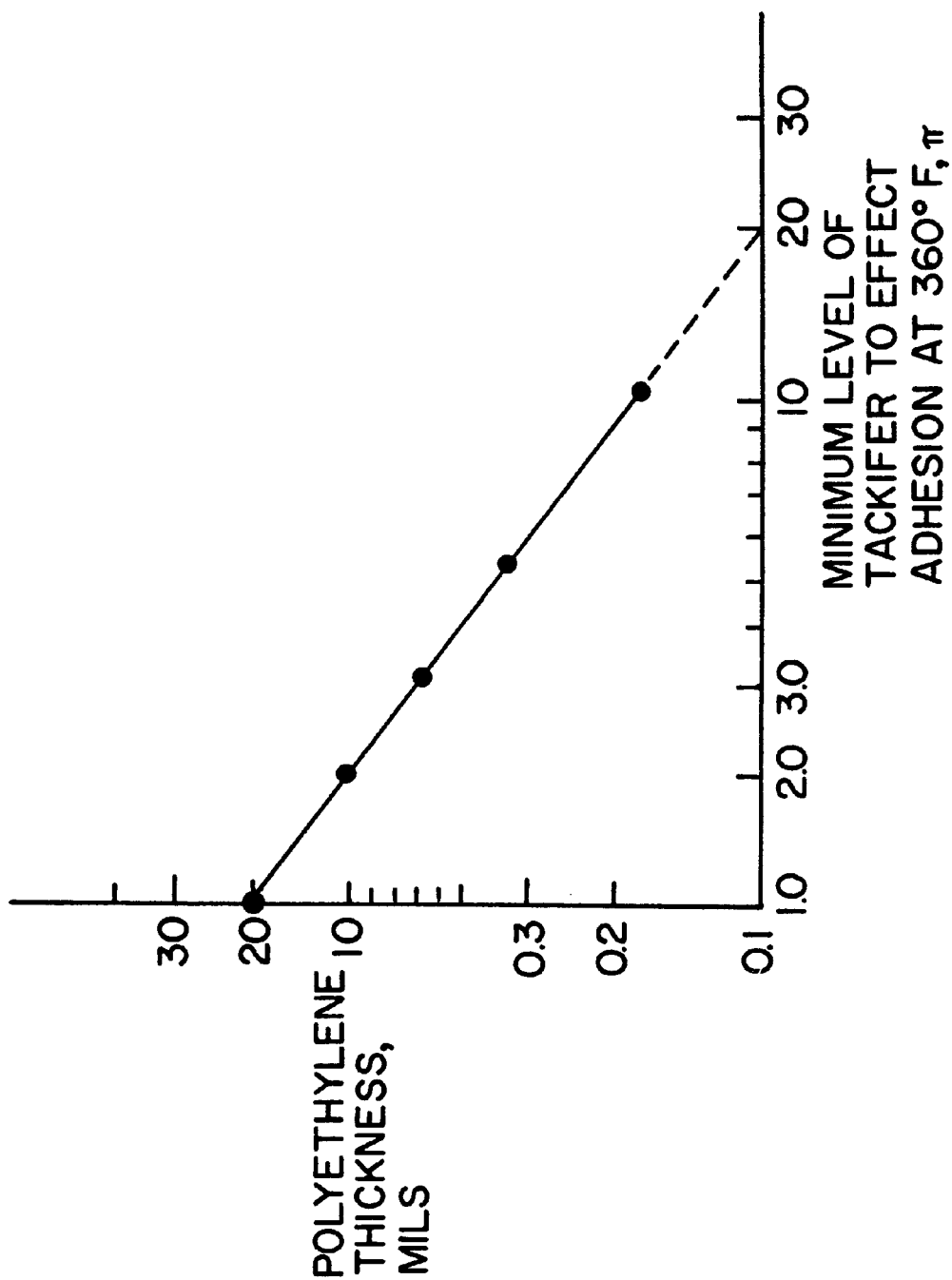

LOW TEMPERATURE, HIGH SPEED EXTRUSION COATING PROCESS AND POLYETHYLENE COMPOSITIONS USEFUL THEREFOR CONTAINING A THERMALLY SENSITIVE ADDITIVE

This is a continuation application of application Ser. No. 07/681,801 filed on Apr. 5, 1991, abandoned which is a continuation-in-part of Ser. No. 07/578,036 filed Sep. 5, 1990 which is a continuation-in-part of Ser. No. 07/366,903 filed Jun. 15, 1989, both abandoned.

This invention relates to extrusion coating processes. In one aspect, this invention relates to polyethylene compositions useful for extrusion coating. In another aspect, this invention relates to high speed extrusion coating, wherein the extruded material exhibits excellent adhesion to substrate, even when the extrusion process is carried out at unusually low extrusion coating temperatures. In another aspect the present invention relates to coatings containing high loadings of hygroscopic additives. Yet another aspect of the present invention relates to coatings containing additives that are heat sensitive.

BACKGROUND OF THE INVENTION

Extruding a coating of a polyolefin or blends of polyolefins onto a substrate, such as paper or aluminum foil, to form an extrusion coated substrate, is well known in the art. Various polyethylenes and blends of polyethylenes have been widely used as extrusion coating compositions. However, these polyethylene-based coatings must be extrusion coated at high temperatures to effect good adhesion to the substrate and therefore, have several drawbacks.

High temperature extrusion coating processes are not useful with substrates which are temperature sensitive. High temperature extrusion coating processes are also not practical when applying coatings containing additives which are temperature sensitive. The temperature of the high temperature extrusion coating process can be reduced very slightly but then the coating speed must also be reduced considerably to maintain good adhesion. However, high coating speeds are important so as to enable economically attractive operation of extrusion coating equipment.

What is desired, therefore, are polyethylene-based extrusion coating materials which contain thermally sensitive additives that are capable of adhering to substrates while producing substantially uniform extrusion coatings when applied to a variety of substrates, including photographic paper, employing a process which operates at adequate coating speeds at temperatures below those ordinarily used for extrusion coating processes.

STATEMENT OF THE INVENTION

In accordance with the present invention, there are provided novel compositions comprising a defined polyethylene component, specified quantities of defined tackifying resins, and defined loadings of thermally sensitive additives. The inventive compositions are capable of being applied to a variety of substrates by an extrusion coating process carried out at an extrusion coating temperature of less than about 550° F. (about 290° C.). The inventive extrusion coating process is capable of applying substantially uniform coatings having a thickness as thin as about 0.0075 mm at a coating speed in excess of about 300 meters (about 1,000 feet) per minute.

BRIEF DESCRIPTION OF THE FIGURES

FIG. 3 illustrates the relationship of the thickness of the neat polyethylene tackifier blend versus the minimum level of tackifier needed for good adhesion.

DETAILED DESCRIPTION OF THE INVENTION

Figure 1:
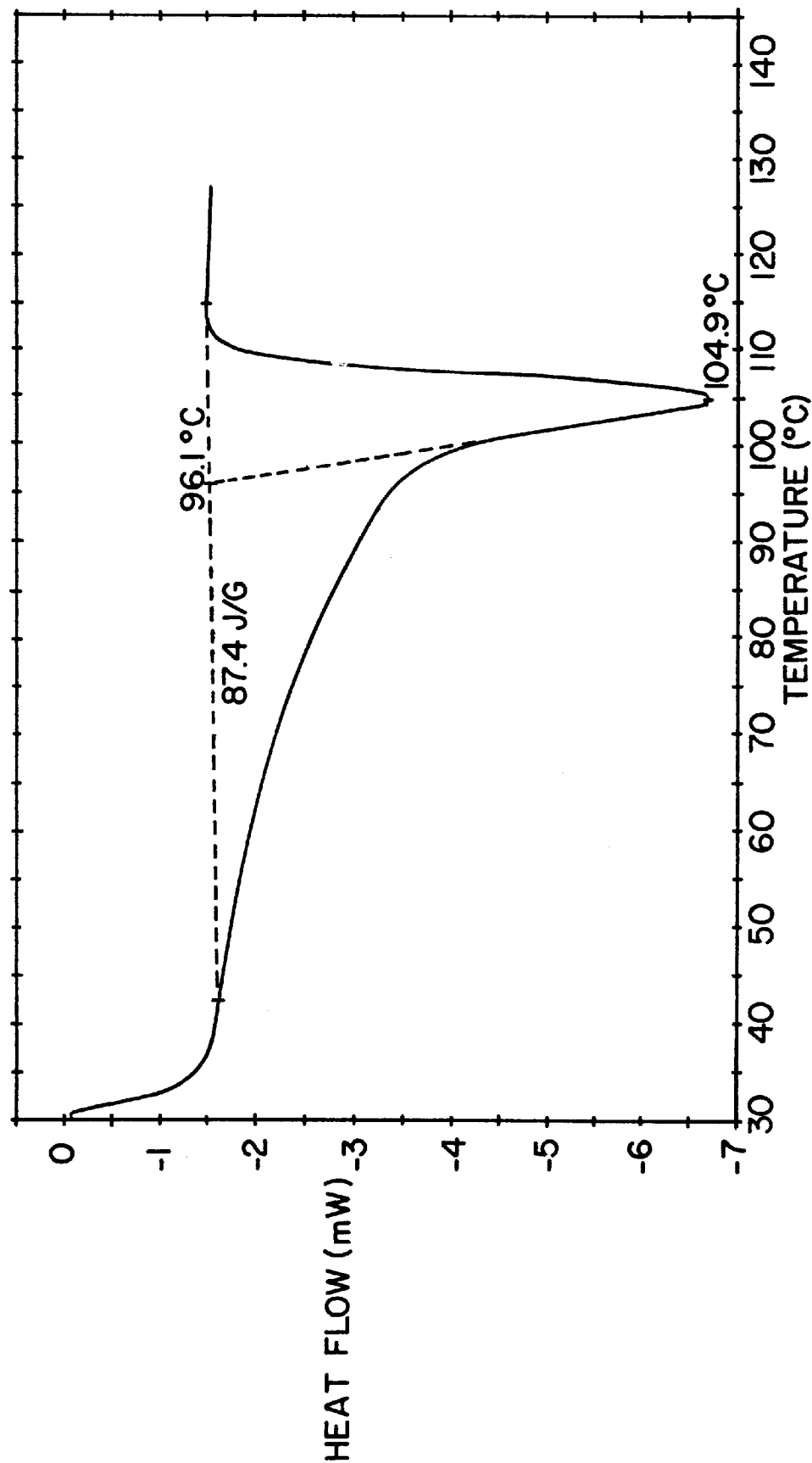
FIG. 1 is a differential scanning calorimetry (DSC) curve of a polyethylene containing tackifier.

In accordance with the present invention, there are provided compositions capable of low temperature extrusion coating with good adhesion to substrate. The invention compositions comprise:

(a) A polyethylene component or polyethylene component blend having a melt index in the range of about 10 up to 100 dg/min at 190° C. and having a sufficiently broad molecular weight distribution so that the resulting composition is capable of being extrusion coated at a temperature in a range of 350° up to 550° F. (about 175° up to 290° C.), (b) in the range of about 0.5 up to 15 weight percent, based on the weight of the total of (a) plus (b) of a hydrocarbon tackifying resin having a Ring and Ball Softening Point (RBSP) in the range of about 90 up to 150° C., and (c) at least one thermally sensitive additive selected from (1) relatively high loadings of additives that contain a sufficient amount of volatiles that create unsatisfactory imperfections at relatively high extrudate temperatures, and (2) additives that degrade or volatilize at or below normal extrusion coating temperatures.

In accordance with a particular embodiment of the present invention, there is provided a process for the low temperature extrusion coating of a substrate with a polyethylene type film having a thickness as thin as about 0.0075 mm, wherein the extrusion coating process is capable of substantially uniformly coating with good adhesion at the thickness even at a coating speed of at least about 300 meters (about 1,000 feet) per minute of substrate at temperatures less than about 550° F. (290° C.). The inventive process comprises applying the above-described compositions to at least one surface of the substrate by extrusion coating at a temperature in the range of about 350° up to 550° F. (about 175° up to 290° C.). It is preferred that this extrusion coating temperature be in the range of about 400° up to 525° F. (about 205° C. to 275° C.). In some applications it is preferred that this extrusion coating temperature be in the range of about 350° up to 480° F. (about 175° up to 250° C.). However, for photographic paper intended for resin coating, it is preferred that this temperature range be about 450° up to 525° F. (about 230° C. to 275° C.).

In accordance with yet another embodiment of the present invention, there are provided articles of manufacture comprising substrate having adhered thereto a polyethylene composition comprising:

(A) a polyethylene component having a melt index in the range of about 10 up to 100 dg/min at 190° C. and having a sufficiently broad molecular weight distribution so that the resulting composition is capable of being extrusion coated at a temperature in the range of 350 up to 550° F. (about 175° to 290° C.), (B) hydrocarbon tackifying resin (tackifier) having an RBSP in the range of about 90 up to 150° C. present in the range of about 0.5 up to 15 weight percent based on the weight of the total of polyethylene composition and tackifier, and (C) at least one thermally sensitive additive selected from (1) relatively high loadings of additives that contain sufficient amount of volatiles to create unsatisfactory imperfections at relatively high temperatures and (2) additives that degrade or volatilize at or below normal extrusion coating temperatures.

The melt index of the polyethylene component defined above must be such that it enables the resulting composition, in combination with a level of tackifier, to be extrusion coated with good adhesion to the substrate at a required temperature, thickness, and speed. Although the polyethylene component must have these properties, in combination with various levels of tackifier, the resulting composition is not so limited and does not necessarily have to meet these properties at all concentrations of tackifier. The amount of tackifier particularly in the range of 0.5 to 15 wt. %, needed to maintain good adhesion is proportional to the extrusion speed at a constant extrusion output rate and is inversely proportional to the coating thickness and extrusion temperature. Thus, an increase in extrusion speed may necessitate an increase in the amount of tackifier wherein as a decrease in the coating thickness or extrusion temperature may necessitate an increase in the amount of tackifier.

Polyethylene compositions useful in the practice of the present invention are materials having a melt index at 190° C. in the range of about 10 up to 100 decigrams per minute. Preferred polyethylene components are materials having a melt index in the range of about 15 up to 80 decigrams per minute; with materials having melt index in the range of about 20 up to 70 being most preferred.

Alternatively, the polyethylene component used in the practice of the present invention can be selected so as to provide a final composition having a melt index in the range of about 15 up to 125 decigrams per minute at 190° C. Preferred polyethylene materials are those which provide a final composition having a melt index in the range of about 30 up to 90 decigrams per minute; with final compositions having a melt index in the range of 30 up to 80 being most preferred.

Polyethylene materials useful in the practice of the present invention typically have densities in the range of about 0.915 g/cc up to 0.96 g/cc such as blends of polyethylenes of varying densities. Polyethylenes having densities in the range of about 0.915 g/cc up to 0.945 g/cc are presently preferred materials.

It is desirable that the polyethylene materials employed in the practice of the present invention have a sufficiently broad molecular weight distribution so that the resulting composition is capable of being extrusion coated at temperatures in the range of about 350° up to 550° F. (about 175° up to 290° C.). Those of skill in the art recognize that materials of very narrow molecular weight distribution will not be suitable for the desired extrusion coating application, while materials having intermediate, up to very broad molecular weight distributions, will be more suitable for the desired extrusion coating application. Typically, materials employed in the practice of the present invention will have a polydispersity index, i.e., ratio of weight average molecular weight (Mw) to number average molecular weight (Mn), of at least about 7.

It is also desirable that the polyethylene materials employed in the practice of the present invention have a minimum melting point onset temperature of at least about 95° C., as measured by differential scanning calorimetry (DSC). Materials having such melting properties provide excellent processing characteristics for extrusion coating applications.

A DSC curve of an exemplary composition without the thermally sensitive additive is presented in FIG. 1. The composition employed to obtain this DSC curve is a material having a melt index of about 32 dg/min and a density of about 0.915 g/cc. This material was prepared by blending 90 weight percent of a low density polyethylene having a melt index of about 20 dg/min with 10 weight percent of NIREZ 1135 tackifying resin. From the figure, it can be seen that the sample has an onset melting point (determined by extrapolation as shown) of 96.1° C., with an actual melting point of about 105° C.

Figure 2A:
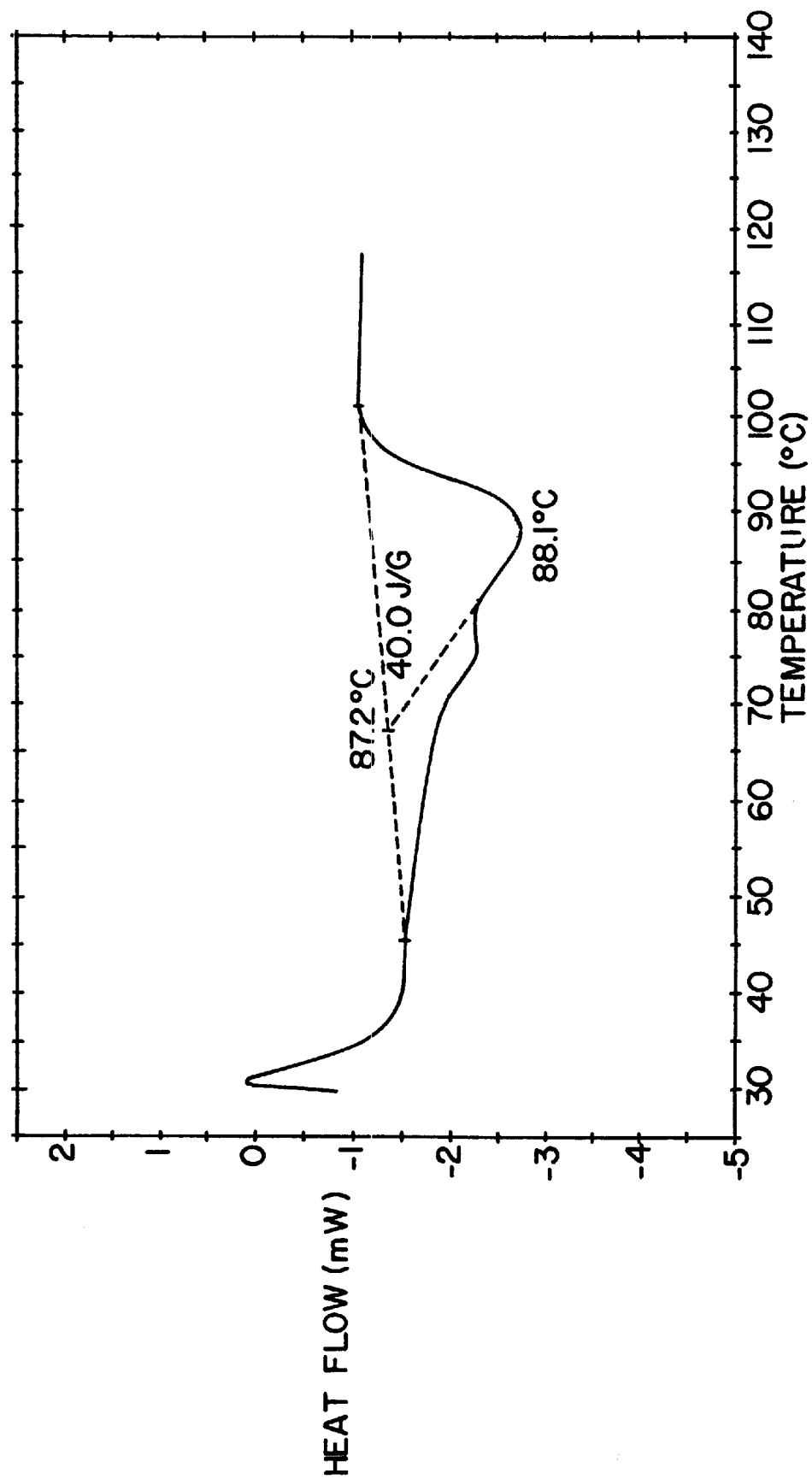
FIGS. 2a through 2d are DSC curves for several prior art polyethylene extrusion coating compositions.
Figure 2B:
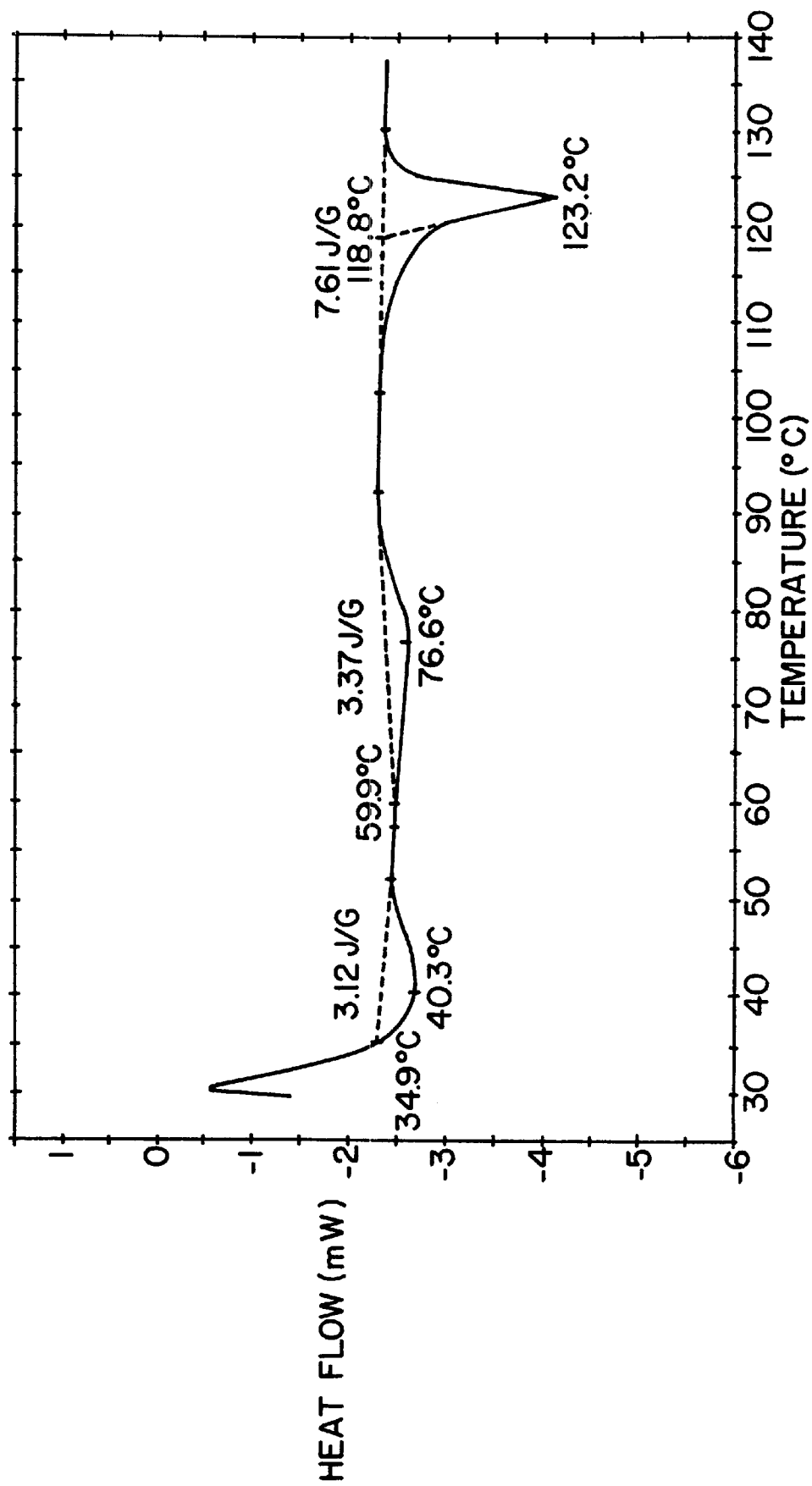
Figure 2C:
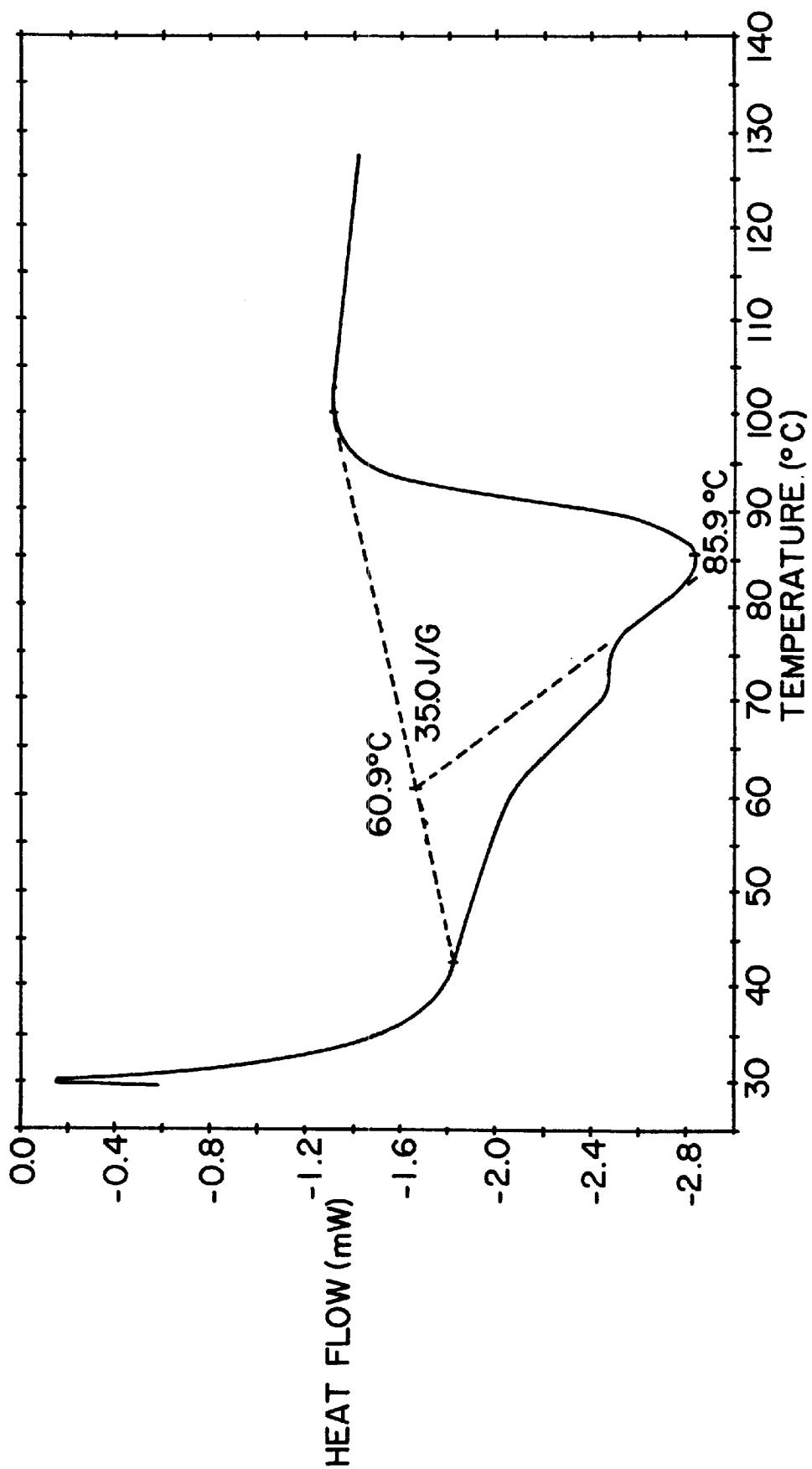
Figure 2D:
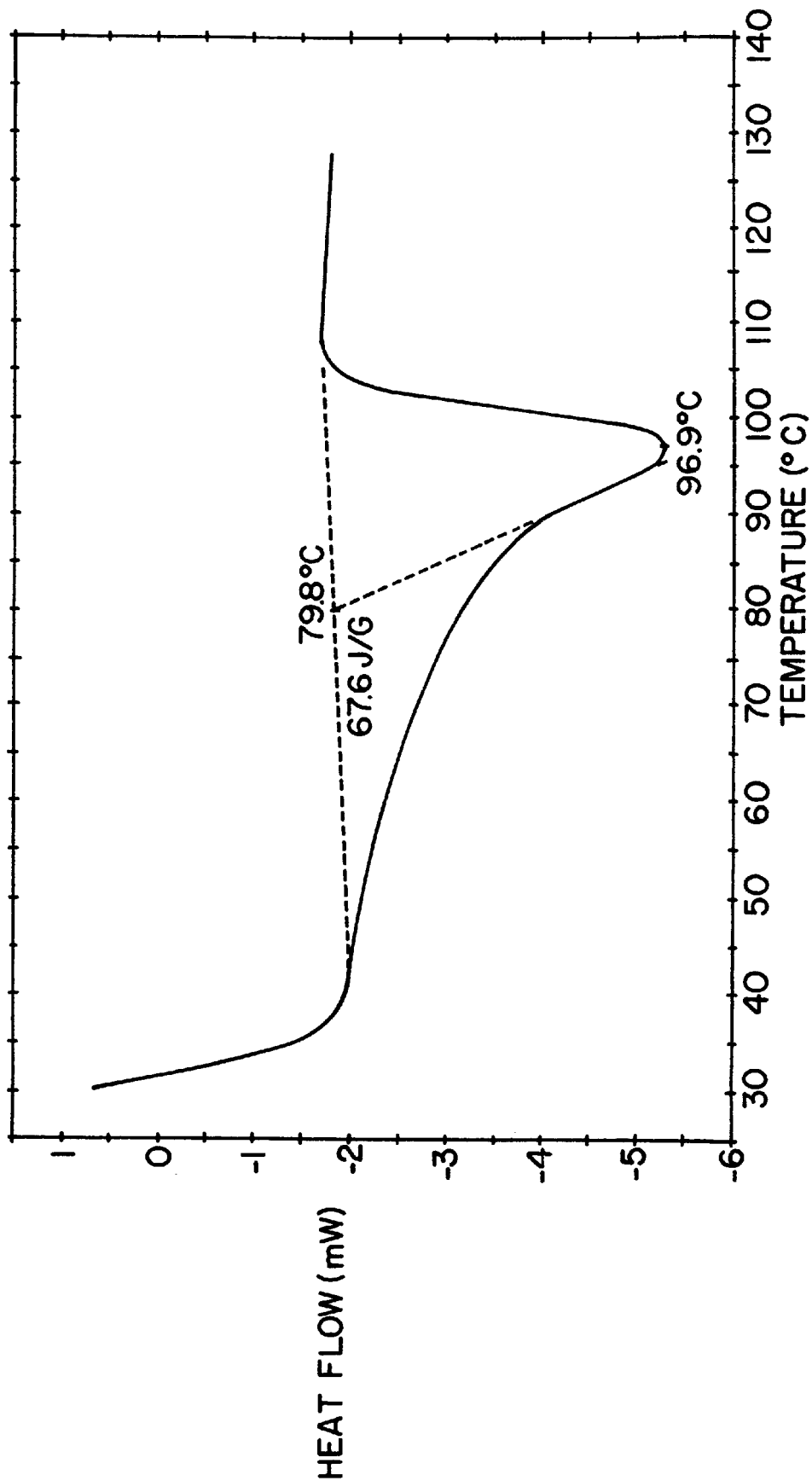

For comparison, DSC curves for several prior art, commercially available polyethylene extrusion coating compositions are presented in FIG. 2a through 2b. In FIG. 2a, the DSC curve for BYNEL CXA is presented. BYNEL CXA is available from DuPont and is characterized as ethylene terpolymers containing a temperature stable ester in combination with high acidic functionality. In FIG. 2b, the DSC curve for ADMER 507 is presented. ADMER 507 is available from Mitsui Petrochemical and is characterized as a "polyolefin blend" for adhesion to ethylene-vinyl alcohol-type polyolefins. SURLYN 8255, available from DuPont, is shown in FIG. 2c. This material is a metal salt of an ethylene-acrylic acid copolymer. Primacor 3440, available from Dow, is shown in FIG. 2d. This material is an ethylene-acrylic acid copolymer. Each of these prior art materials are seen to have an onset melting point substantially below that of the polyethylene tackifier composition blend of the present invention.

Polyethylene materials useful in the practice of the present invention can be prepared by polymerizing relatively high purity ethylene in a stirred reactor at pressures above about 1,000 atmospheres and temperatures above about 200° C., using a peroxide-type of catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the text Polythene by Renfrew and Morgan, at pp. 11–17 and the article in Petroleum Refiner (1956) by Thomasson, McKetta and Ponder, found at p. 191.

The polyethylene composition of the present invention can be a polyethylene blend containing minor amounts of other polyolefins such as: polyethylene copolymers and propylene homo or copolymers. This minor amount of other polyolefin is generally less than about 40 wt. %, preferably less than about 20 wt. %, with less than about 10 wt. % being most preferred.

The tackifying resins useful in the compositions of this invention have RBSP's of about 90° C. to 150° C., and can be a hydrocarbon resin such as DAC-B hydrocarbon resin prepared according to the process disclosed in U.S. Pat. No. 3,701,760 as well as other hydrocarbon resins, synthetic and natural polyterpenes, rosin esters and the like. The preferred tackifying resins are the synthetic tackifying resins due to their better color characteristics. The water white tackifying resins are more preferred, especially for photographic papers.

One suitable hydrocarbon tackifying resin is a hydrocarbon resin having a softening point of 130° C. and available commercially as Eastman Resin H-130 from Eastman Chemical Products, Inc. Other examples of commercially available resins that are suitable hydrocarbon tackifying resins include "Wingtack 95" as sold by the Goodyear Tire and Rubber Co., the STA-TAC and SUPER STA-TAC resins sold by the Reichhold Division of Swift Adhesives Company, and EASTOTAC, a hydrogenated polymer of $C_5$ hydrocarbons (sold by Eastman Chemical Products, Inc.). Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a RBSP of from about 90° to 150° C.; an acid number of from about 0 to 2; and a saponification value of less than about 1. The preferred hydrocarbon tackifying resins have higher functionality. Also suitable tackifiers are polymers of vinyl aromatic monomers, such as a preferred tackifier PICCOTEX 120 (available from Hercules Chemical), a copolymer of alpha-methyl styrene and vinyl toluene. This material has an RBSP of about 120° C.

Additional suitable resins are the rosin ester resins and the terpene polymers such as the polymeric, resinous materials including the dimers as well as high polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Other useful resin esters are the pentaerythritol esters of rosin having an acid number of about 7 to 16 and a RBSP of about 100° to 110° C., such as the Zonester family of products available from Arizona Chemical. One such resin is the pentaerythritol ester of tall oil rosin having a RBSP of 100° C. and an acid number of about 11. The most preferred tackifiers are the polyterpenes such as the NIREZ polyterpenes, polymerized from beta-pinenes including the most preferred tackifier, NIREZ 1135, having an RBSP between 125° C. and 140° C., available from the Reichold Division of Swift Adhesives Company.

The quantity of tackifying resin employed in the inventive compositions can vary widely, typically falling within the range of about 0.5 up to 15 weight percent, based on the weight of the total weight of polyethylene component and tackifying resin. Preferred quantities of tackifying resin fall within the range of about 1 up to 10 weight percent. These quantities are preferred because at these levels of tackifier, maximum adhesion per quantity of tackifier added is achieved. Thus, at a given thickness at lower levels of tackifier, reduced adhesion is observed while little added benefit is obtained with higher levels of tackifier.

Although the preferred tackifiers are water white they will discolor and degrade with time rendering the tackifier unsatisfactory for use, particularly for photographic purposes. It is therefore important that these tackifiers be stabilized with a stabilizer such as a hindered phenolic antioxidant. Examples of hindered phenolic antioxidants include butylated hydroxytoluene (BHT) and its derivatives such as, IRGANOX 1076, IRGANOX 1010, and the like, with Irganox 1010 being most preferred. The Irganox stabilizers are available from Ciba-Geigy. The amount of stabilizer used in the composition is directly proportional to the amount of tackifier present in the composition. The amount of this stabilizer generally ranges from about 0.1 up to 0.3 weight percent based on the total of polyethylene and tackifier. This amount of stabilizer is preferably between about 0.1 and 0.2 weight percent.

The thermally sensitive additives that can be used in the present invention include (1) relatively high loadings of additives that contain a sufficient amount of volatiles that can create unsatisfactory imperfections in extrusion coatings applied at relatively high extrudate temperatures, and (2) additives that degrade or volatilize below 600° F. (315° C.) but above the melting point of polyethylene.

We have discovered that the thermally sensitive additives that contain or produce relatively high amounts of volatiles during extrusion coating are concentration limited at normal extrusion coating temperatures such as above 600° F. (above 315° C.). In other words, relatively high loadings of these additives produce unsatisfactory imperfections such as voids, lacing, pigment lines, moisture lines, bubbles, etc. at the normal extrusion coating temperatures. We have discovered that these unsatisfactory imperfections are due to the release of volatiles from particulate additives that are absorbed or adsorbed compounds on or in the additive particles, such as water, including water of hydration. It was unexpectedly discovered that by reducing the extrudate temperature as little as 50° F. (to 550° F., 290° C.) these volatiles are not driven off in such a way as to produce undesirable imperfections in the resulting coatings. The volatiles that have a relatively high vapor pressure or are easily driven off are of no consequence and do not cause defects in the coatings since it is believed that these volatiles vaporize or are driven off fairly early on in the process and back vent out of the extruder.

It is believed that the process of the present invention can successfully extrusion coat compositions containing high loadings of most hygroscopic or hydrophilic additives. The present invention permits inclusion of new additives that heretofore were not normally extrusion coatable due to their volatile content. Additionally, the present invention permits inclusion of significantly higher amounts of presently known extrusion coating additives.

The preferred relatively high loadings of additives or combination of additives that contain high amounts of volatiles are in excess of about 10 wt. % based on the total, more preferably in excess of 20 wt. % up to 50 wt. %. Examples of suitable additives include calcium carbonate, aluminum oxide, silicon dioxide, diatomaceous earth, talcs, zinc oxide, various carbon blacks, the anatase and rutile forms of titanium dioxide, the like and mixtures thereof. The most preferred additives are carbon blacks and titanium dioxides. However, certain additives such as carbon black in concentrations as low as 6% cannot be successfully extrusion coated by prior art methods.

In photographic applications the normal concentration of additives is usually less than about 20%. Of this a combination of titanium dioxide and zinc oxide is generally less than about 18% with titanium dioxide ranging from 9 to 18% and zinc oxide ranging from 0 to 3%. Other additives are no more than about 1% total and include optical brighteners, stabilizers, antioxidants, and colorants. The process of the present invention permits the amount of titanium dioxide to be greater than 18% up to about 50% and allows the zinc oxide to be greater than 3% with a total combination of titanium dioxide and zinc oxide to be greater than 18% but less than 50% based on the total. This increase in titanium dioxide and zinc oxide can result in an improvement in opacity, whiteness, lightness and image sharpness.

The additives that degrade or volatilize themselves at or below normal extrusion temperatures (600° F., 315° C.) are capable of causing undesirable imperfections in the final coating and/or are not present in their original form and/or concentration.

Examples of suitable additives that degrade or volatilize at these temperatures include organic colorants such as phthalocyanines, organic antioxidants, organic antistats, slip agents, optical brighteners, lubricants and the like. Amounts of these additives are preferably within the range between about 0.05 and 10 wt. %, based on the total. More preferably between about 0.1 and 5 wt. % with about 0.1 and 3 wt. % being most preferred.

Additionally, other suitable additives that degrade at relatively high temperatures include biodegradable organic polymers preferably up to about 10 weight percent. Compounds contemplated by the term "biodegradable organic polymer" include polymeric materials which are themselves intrinsically sensitive to direct enzyme chain scission in the presence of micro-organisms which occur profusely in the environment. Exemplary materials contemplated by the above definition include polymeric carbohydrates such as corn starch.

When employed, quantities in the range of about 1 up to 10 weight percent, based on the total, of biodegradable organic polymer are typical. Preferably, in the range of about 4 up to 6 weight percent of biodegradable organic polymer will be employed.

Other additives, stabilizers, fillers and the like can be added to the composition of the present invention. Such materials can be present in the components forming the polymer blend, or may be added when the polymers are blended to form the extrusion coating composition.

The inventive compositions can optionally further contain in a range of about 25 up to 200 parts per million of a transition metal pro-oxidant. Transition metal compounds contemplated for use in the practice of the present invention are salts formed by combining transition metals such as cobalt, manganese, and copper with organic acids of sufficiently high molecular weight to give salts soluble in the polymer blends employed.

As employed herein, the term "transition metal" is intended to include elements having greater than 8, and less than 18, electrons in the outer shell of the ionic species. Transition metals are thus usually capable of electron transitions between their outer shells. Thus, the variable valency states which result render these elements capable of inducing oxidation reactions. In practice, those transition elements which are highly toxic and/or radioactive are extremely rare and costly, and thus are not normally encountered in industrial use as oxidation catalysts. More typically encountered transition metals whose salts and complexes are useful for such applications include cerium, zinc, copper, silver, nickel, cobalt, iron, manganese, chromium, and vanadium. These elements can be used in the form of such salts as possess an adequate level of solubility in the polymer melt, typically including such forms as stearates, oleates, behenates, miristates, erucates, lineoleates, naphthanates, or complexes such as acetonyl acetates, 8-hydroxyquinolinates, metal amine salt complexes, and the like, as well as mixtures of any two or more thereof.

Preferred quantities of pro-oxidant, when employed, fall in the range of about 100 up to 150 parts per million, based on the total weight of the polyethylene component.

The compositions of this invention may be prepared in various ways such as dry blending and then passing through a compounding extruder, compounding on a milling roll or in a Banbury mixer by fusion. Any method whereby the components are blended will be useful in the present invention. For example, pellets of each polymer can be blended mechanically and the blend then fed to an extruder where it is fused and extruded.

In addition to the above noted advantages, we have discovered that the low temperature extrusion process of the present invention reduces the amount of curl in the final coated product as well as reduces the amount of energy required to conduct the extrusion coating process itself.

Processes for applying the invention extrusion coating materials to a substrate are well known in the art and are well within the skill of the artisan. Similarly, processes employing the invention extrusion coating materials for the extrusion/lamination of two or more substrates are well known in the art. Those of skill in the art can readily apply the invention compositions to such processes.

Substrates contemplated for use in the practice of the present invention include papers, photographic papers, paperboards, fibers, polymeric materials, metal foils, and the like. Polymeric substrates include polyolefins or functionally modified polyolefins, polyesters or functionally modified polyesters, ethylene-vinyl alcohol copolymers or functionally modified derivatives thereof, polyamides or functionally modified polyamides, and the like including embossed and/or oriented polymeric substrates with and without microvoiding agents/pigments such as titanium dioxide, barium sulfate, and calcium carbonate.

The inventive compositions, upon application to substrate by extrusion coating techniques, form a destructive bond, i.e., the substrate-coating bond is sufficiently strong that efforts to separate the coating from the substrate cause destruction of either the coating or the substrate.

This invention can be further illustrated by the following examples of preferred embodiments thereof, although it will be understood that these examples are included merely for purposes of illustration and are not intended to limit the scope of the invention unless otherwise specifically indicated.

EXAMPLES

The following five examples illustrate the relationship of the amount of tackifier to the extrusion speed and coating thickness. The samples in the following five examples were extrusion coated under these identical conditions:

Extrudate temperature: 360° F. (182° C.)

Die opening: 0.020-inch

Extrusion output rate: 10-lb/hr/inch of die width

Die Opening-to-Nip 5.25-inches distance:

Laminator's Maximum 1400-fpm Speed:

Heater settings on the extruder barrel, adapter, and die were 388° C. (198° C.) or lower.

These examples are more easily understood by the graph in FIG. 3. This graph illustrates the relationship of thickness versus the minimum level of tackifier needed to provide excellent adhesion for each of the following five examples.

The following five examples plotted a hyperbolic relationship:

$$(t)(N)=2$$

where t is the thickness of the tackifier-modified polyethylene, expressed in mils; and N is the level of tackifier (Nirez 1135) in the polyethylene, expressed in weight percent. This observation predicts that, a 2-mil polyethylene thickness in a laminated paper-to-paper structure, requires only a minimum level of 1 weight percent of tackifier to provide excellent adhesion. This observation also predicts that, a thinner polyethylene laminate of 0.2-mil requires a higher level (10 weight percent) of tackifier for good adhesion.

Example 1

A 70 dg/min melt index polyethylene containing 1 percent by weight of a tackifier, Nirez 1135 (a polymerized beta-pinene having a RBSP of about 135° C.), was used to laminate natural Kraft paper to Kraft paper. The extrudate temperature was 360° F. (182° C.). The die throughput rate was 10 pounds per hour per inch of die width. The lamination was taken to 1,400 fpm with the extrudate providing a uniform thickness. The final thickness was 0.3 mils (0.0075 mm). At this thickness and speed the material did not have good adhesion. However, the material provided a fiber tear (destructive) adhesion to both layers of Kraft paper at slower coating speeds up to and including 200 fpm (at a thickness of at least 2 mil).

Example 2

A 70 dg/min melt index polyethylene containing 2 percent by weight of a tackifier, Nirez 1135, was used to laminate natural Kraft paper to Kraft paper. The extrudate temperature was 360° F. (182° C.). The die throughput rate was 10 pounds per hour per inch of die width. The lamination was taken to 1,400 fpm with the extrudate providing a uniform thickness. The final thickness was 0.3 mils (0.0075). At this thickness and speed the material did not have good adhesion. However, the material provided a fiber tear (destructive) adhesion to both layers of Kraft paper at slower coating speeds up to and including 400 fpm (at a thickness of at least 1 mil).

Example 3

A 70 dg/min melt index polyethylene containing 3 percent by weight of a tackifier, Nirez 1135, was used to laminate natural Kraft paper to Kraft paper. The extrudate temperature was 360° F. (182° C.). The die throughput rate was 10 pounds per hour per inch of die width. The lamination process was taken to 1,400 fpm with the extrudate providing a uniform thickness. The final laminate thickness was 0.3 mils (0.0075). At this thickness and speed the material did not have good adhesion. However, the material provided a fiber tear (destructive) adhesion to both layers of Kraft paper at slower coating speeds up to and including 600-fpm (at a thickness of at least 0.75 mil).

Example 4

A 32 dg/min melt index polyethylene containing 5 percent by weight of a tackifier, Nirez 1135, was used to laminate natural Kraft paper to Kraft paper. The extrudate temperature was 360° F. (182° C.). The die throughout rate was 10 pounds per hour per inch of die width. The lamination was taken to 1,400 fpm with the extrudate providing a uniform thickness. The final thickness was 0.3-mil (0.0075). At this thickness and speed the material did not have good adhesion. However, the material provided a fiber tear (destructive) adhesion to both layers of Kraft paper at a coating speed of 1,000 fpm (at a 0.4 mil thickness).

Example 5

A 36 dg/min melt index polyethylene containing 10 percent by weight of a tackifier, Nirez 1135, was used to laminate natural Kraft paper to Kraft paper. The extrudate temperature was 360° F. (182° C.). The die throughout rate was 10 pounds per hour per inch of die width. The lamination was taken to a speed of 1,400 fpm with the extrudate providing a uniform thickness. The final thickness was 0.3 mil (0.0075). The material provided a fiber tear (destructive) adhesion to both layers of Kraft paper at 1,300 fpm (at a 0.3 mil thickness).

The following ten examples show the criticality of melt index in achieving the required minimum coating thickness of at least about 0.0075 mm at extrusion coating speeds in excess of about 300 m per minute. The samples were extrusion coated under these identical conditions:

Extrudate temperature: 440° F. (227° C.)
Die Opening: 0.020-inches
Extrusion Output Rate: 10-lb/hr/inch of die width
Die Opening-to-Nip 5.25-inches distance:
Laminator's Maximum 1400-fpm Speed:
Heater settings on the extruder barrel, adapter, and die were 460° F. (238° C.) or lower.

Example 6

A 3.5 dg/min melt index polyethylene containing 10 percent by weight of a tackifier, Nirez 1135, was extrusion coated as described above. It was only possible to achieve a minimum thickness of 1.3 mils (0.033 mm) at a maximum speed of 325 fpm (about 100 meters per minutes), as limited by extrudate edge tear.

Example 7

A 7.0 dg/min melt index polyethylene containing 10 percent by weight of a tackifier, Nirez 1135, was extrusion coated as described above. It was only possible to achieve a minimum thickness of 0.9 mils (0.023 mm) at a maximum speed of 475 fpm (145 m/min), as limited by extrudate edge tear.

Example 8

A 13 dg/min melt index polyethylene containing 10 percent by weight of a tackifier, Nirez 1135, was extrusion coated as described above. It was only possible to achieve a minimum thickness of 0.5 mil (0.013 mm) at a maximum speed of 875-fpm (255 m/min), as limited by extrudate edge tear.

Example 9

A 20 dg/min melt index polyethylene containing 10 percent by weight of a tackifier, Nirez 1135, was extrusion coated as described above. It was only possible to achieve a minimum thickness of 0.4-mils (0.010 mm) at a maximum speed of 1,050 fpm (320 m/min), as limited by extrudate edge tear.

Example 10

A 32 dg/min melt index polyethylene containing 10 percent by weight of a tackifier, Nirez 1135, was extrusion coated as described above. It was only possible to achieve a minimum thickness of less than 0.3 mil (0.0075) at a maximum speed in excess of 1,400 fpm (430 m/min). No extrudate edge tear or edge weaving were observed at a coating speed of 1,400 fpm (430 m/min).

Example 11

A 50 dg/min index polyethylene containing 10 percent by weight of a tackifier, Nirez 1135, was extrusion coated as described above. It was possible to achieve a minimum thickness of less than 0.3 mil (0.0075 mm) at a maximum speed in excess of 1,400 fpm (430 m/min). No extrudate edge tear or edge weaving were observed at a coating speed of 1,400 fpm (430 m/min).

Example 12

A 80 dg/min melt index polyethylene containing 10 percent by weight of a tackifier, Nirez 1135, was extrusion coated as described above. It was possible to achieve a minimum thickness of less than 0.3 mil (0.0075 mm) at a maximum speed in excess of 1,400 fpm (430 m/min). No extrudate edge tear or edge weaving were observed at a coating speed of 1,400 fpm (430 m/min).

Example 13

A 100 dg/min melt index polyethylene containing 10 percent by weight of a tackifier, Nirez 1135, was extrusion coated as described above. It was only possible to achieve a minimum thickness of 1.2 mils (0.030 mm) at a maximum speed of 350 fpm (107 m/min), as limited by severe weaving of the extrudate edge.

Example 14

A 130 dg/min melt index polyethylene containing 10 percent by weight of a tackifier, Nirez 1135, was extrusion coated as described above. It was only possible to achieve a minimum thickness of 1.5 mils (0.039 mm) at a maximum speed of 275 fpm (84 m/min), as limited by severe weaving of the extrudate edge.

Example 15

A 200 dg/min melt index polyethylene containing 10 percent by weight of a tackifier, Nirez 1135, was extrusion coated as described above. It was only possible to achieve a minimum thickness of 2.1 mils (0.053 mm) at a maximum speed of 200 fpm (61 m/min), as limited by severe weaving of the extrudate edge.

The following examples illustrate the ability of the present invention to extrusion coat compositions containing relatively high loadings of additives that contain high amounts of volatiles that normally create unsatisfactory imperfections at normal extrusion temperatures.

Example 16

This example illustrates the coating versatility of a photographic quality paper coating resin formulation as a function of hygroscopic additive concentration and extrudate temperature in the extrusion coating process. Varying concentrations of the following two compositions were dry blended to effect varying levels of the hygroscopic additives as illustrated in Table 1 below.

Concentrate composition 1:

37.57 wt. % anatase titanium dioxide 9.0% zinc oxide 1.5% calcium stearate 0.15 optical brightener 0.2779 Irganox 1076

0.5 inorganic blue pigment 0.02% organic red pigment

The remainder being a polyethylene having a melt index of 4 dg/min and a density of 0.92 g/cc.

Concentrate Composition 2:

10% Nirez 1135

0.1% Irganox 1010

The remainder being a polyethylene having a melt index of 20 dg/min and a density of 0.916 g/cc.

The samples in Table 1 below were extrusion coated under the following conditions:

Die Opening: 0.020-inches

Extrusion Output Rate: 10-lb/hr/inch of die width

Die Opening-to-Nip About 5 inches distance

Coating Weight: 33-g/m$^2$

TABLE 1

| Percent Nirez % | Hygroscopic Additive | | % Other | Defects in Coating at the Following Extrudate Temp. | | | |
|---|---|---|---|---|---|---|---|
| 1135 | % TiO2 | % ZnO | Additives | 400° F.(205° C.) | 450° F.(232° C.) | 550° F.(290° C.) | 630° F.(332° C.) |
| 6.8% | 12% | 2.9% | 0.8% | None | None | None | very light pigment lines |
| 6.0% | 15% | 3.6% | 1.0% | None | None | None | pigment lines |
| 4.7% | 20% | 4.8% | 1.3% | None | None | very light pigment lines | pigment lines |
| 3.3% | 25% | 5.9% | 1.6% | None | None | pigment lines | pigment lines |
| 2.2% | 30% | 7.0% | 1.9% | None | None | pigment lines | extreme lacing |
| 0*% | 38% | 9.0% | 2.4% | — | None | pigment lines voids | extreme lacing |

*This extrusion coated composition contained 100% of concentrate composition one and contained no Nirez tackifier. This sample was included to illustrate the relationship of temperature and defects; however, the resulting coating had poor adhesion to the substrate due to the lack of tackifier.

The above example illustrates that the process of the present invention can produce perfect extrusion coating with high loadings of certain hygroscopic additives if a proper extrudate temperature is selected.

Example 17

The following example illustrates the relationship of the amount of tackifier to the adhesion level between paper and polyethylene for extrusions at 600° F. without tackifier and at 495° F. with tackifier. These coatings were made onto photographic grade paper using low density polyethylene and the results are illustrated below in Table 2. This example was extrusion coated under the following conditions:

Extrudate Temp.: See Below

Die Opening: 0.040-inch

Extrusion Output rate: 6.3 lbs/hr/inch of die width

Die Opening-to-Nip: 5.25

Corona Discharge Treat-On meant (CDT)

Coating Weight: 48 g/m$^2$

| Extrusion Temp. | Tackifier Level (% Nirez 1135) | Adhesion Level (gms/0.5 inch) |
|---|---|---|
| 600° F. (315° C.) | 0 | 540 |
| 495° F. (257° C.) | 1% | 130 |
| 495° F. (257° C.) | 3% | 300 |
| 495° F. (257° C.) | 6% | 560 |
| 495° F. (257° C.) | 10% | 980 |

*This coating composition also contained 0.1 wt. % antioxidant and the remainder was polyethylene having a melt index of 20 dg/min and a density of 0.916 g/cc.

This example indicates that the adhesion between the polyethylene and the photographic grade paper at lower temperatures can be improved by increasing the amount of tackifier and that the adhesion level achieved by extrusion coating without tackifier at 600° F. (315° C.) can be met or exceeded by extrusion at 495° F. (257° C.) at certain amounts of tackifier.

Example 18

The following example illustrates that the amount of titanium dioxide can be significantly increased-in the resin layer of a resin coated photographic grade paper without producing underlying coating imperfections as illustrated in Table 3.

Extrudate Temp.: See Table 3
Die Gap: 0.040-inch
Extrusion Output Rate: 6.3 lbs/xhr/inch of die width
Die Opening to Nip: 5.25 inch
CDT: On

TABLE 3*

| Extrudate Temperature | Extrusion Thickness (Mils) | % TiO2 | % Zno | % Tack-ifier | Nirez Coating Quality | Adhesion |
|---|---|---|---|---|---|---|
| 615° F. (324° C.) | 1 | 12 | 3 | 0 | Excellent | Excellent |
| 615° F. (324° C.) | 1 | 24 | 3 | 0 | Pigment Lines | |
| 505° F. (263° C.) | 1 | 24 | 3 | 9 | Excellent | Excellent |
| 505° F. (263° C.) | 0.5 | 24 | 3 | 9 | Excellent | Excellent |
| 505° F. (263° C.) | 1 | 12 | 3 | 9 | Excellent | Excellent |

*These coating compositions also contained between 0.25 and 0.5 calcium stearate and between 0.05 and 0.1% antioxidant with the remainder being polyethylene having a melt index of 20 dg/min and density of 0.916 g/cc.

This example shows that the amount of titanium dioxide that is capable of being extruded at 600° F. is limited by the quality of coating. However, this quality limit does not exist when the tackifier is present at the lower temperature. This invention allows potential improvements in whiteness, brightness, lightness and image sharpness of photographic papers. In addition, the thickness of the extrusion coating can also be reduced substantially without any detriment to the quality of the resin coated photographic support.

Example 19

This example illustrates the coating quality as a function of hygroscopic additive concentration and extrudate temperature in the extrusion coating process. Varying concentrations of the following two compositions were dry blended to effect varying levels of the hygroscopic additive as illustrated in Table 4 below.

Concentrate Composition 1:
30% Carbon Black containing 1% Water
The remainder being a polyethylene having a melt index of 12 dg/min and a density of 0.918 g/cc.
Concentrate Composition 2:
10% Nirez 1135
0.1 wt. % Irganox 1010
The remainder being a polyethylene having a melt index of 20 dg/min and a density of 0.916 g/cc.
The following samples in Table 4 were extrusion coated under the following conditions:
Extrudate Temperatures: See Table
Die Opening: 0.020-inches
Extrusion Output Rate: 10 lb/hr/inch die width
Die opening-to-Nip About 5 inches distance
Coating Weight: 33-g/m$^2$

TABLE 4

| % Nirez | % Water in the Extrudate* | % Carbon Black | Defects in Coating at the following extrusion temperatures | |
|---|---|---|---|---|
| | | | 450° F. (232° C.) | 600° F. (315° C.) |
| 8.2 | 0.15 | 5 | None | Voids & Light Moisture Lines |
| 6.7 | 0.3 | 10 | None | Extreme Lacing |
| 5.0 | 0.5 | 15 | None | Extreme Lacing |
| 3.3 | 0.6 | 20 | None | Extreme Lacing |

*The carbon black contains about 1% water determined by thermogravimetric analysis (TGA).

The above example illustrates that the process of the present invention produces perfect extrusion coatings with high loadings of the hygroscopic additive, carbon black, if a proper extrudate temperature is selected.

The invention has been described in detail with particular reference to preferred embodiments thereof, but it will be understood that variations and modifications can be effected within the spirit and scope of the invention.

What is claimed is:

1. A process for the low-temperature extrusion coating of a substrate with a polyethylene film having a thickness of at least about 0.0075 mm, said process comprising applying a composition to at least one surface of said substrate by extrusion coating at a temperature in the range of 175° up to 290° C. said composition comprising:
   (a) a polyethylene component having a melt index in the range of about 10 up to 100 dg per minute at 190° C. and having a sufficiently broad molecular weight distribution so that the resulting composition is capable of being extrusion coated at a temperature in the range of 175° C. up to 290° C.,
   (b) in the range of about 0.5 up to 15 weight percent, based on the weight of the total of (a) plus (b), of a hydrocarbon tackifying resin having a RBSP in the range of about 90° up to 150° C., and (c) at least one thermally sensitive additive that is not sensitive at a point within the range of 175° to 190° C. at relatively high loadings of additives that contain a sufficient amount of volatiles that create unsatisfactory imperfections at relatively high temperatures, and a concentration in excess of about 10 weight percent based on the total wherein said thermally sensitive additive is a hygroscopic or hydrophilic additive.

2. The process in accordance with claim 1 wherein said substrate is selected from papers, photographic papers, paperboards, fibers, polymeric materials, and metal foils.

3. The process in accordance with claim 2 wherein said substrate is a thermally sensitive substrate.

4. The process according to claim 1 wherein the applying of (a) is conducted at a coating speed in excess of about 300 meters per minute.

5. The process according to claim 1 wherein said extrusion coating temperature is 175° to 250° C.

6. The process according to claim 1 wherein the thermally sensitive additive is selected from the group consisting of carbon blacks, and titanium dioxides.

7. The process according to claim 1 wherein the hygroscopic or hydrophilic additive is present in the composition in a concentration in excess of about 20 weight percent up to 50 weight percent.

8. The process according to claim 1 wherein said polyethylene of (a) has a polydispersity index of at least about 7.

9. A process for the low-temperature extrusion coating of a substrate with a polyethylene film having a thickness of at least about 0.0075 mm, said process comprising applying a composition to at least one surface of said substrate by extrusion coating at a temperature in the range of 175° up to 290° C. said composition comprising:

(a) a polyethylene component having a melt index in the range of about 10 up to 100 dg per minute at 190° C. and having a sufficiently broad molecular weight distribution so that the resulting composition is capable of being extrusion coated at a temperature in the range of 175° C. up to 290° C., (b) in the range of about 0.5 up to 15 weight percent, based on the weight of the total of (a) plus (b), of a hydrocarbon tackifying resin having a RBSP in the range of about 90° up to 150° C., and (c) at least one thermally sensitive additive that is not sensitive at a point within the range of 175° to 190° C. at relatively high loadings of additives that contain a sufficient amount of volatiles that create unsatisfactory imperfections at relatively high temperatures, and a concentration in excess of about 10 weight percent based on the total wherein said thermally sensitive additive is a hygroscopic or hydrophilic additive said composition containing a minor amount of another polyolefin other than the polyethylene of (a) at a concentration less than about 40 weight percent.

* * * * *